(12) United States Patent
Izumaru et al.

(10) Patent No.: US 10,391,401 B2
(45) Date of Patent: Aug. 27, 2019

(54) GAME SYSTEM, ITS CONTROL METHOD AND A NON-TRANSITORY STORING MEDIA READABLE ON A COMPUTER DEVICE

(71) Applicant: CAPCOM CO., LTD., Osaka (JP)

(72) Inventors: Koji Izumaru, Osaka (JP); Tsuyoshi Nagayama, Osaka (JP); Yuichi Sakatani, Osaka (JP); Isamu Hara, Osaka (JP)

(73) Assignee: CAPCOM CO., LTD., Chuo-Ku, Osaka (JP)

( * ) Notice: Subject to any disclaimer, the term of this patent is extended or adjusted under 35 U.S.C. 154(b) by 117 days.

(21) Appl. No.: 15/500,261

(22) PCT Filed: Jul. 21, 2015

(86) PCT No.: PCT/JP2015/003656
§ 371 (c)(1),
(2) Date: Jan. 30, 2017

(87) PCT Pub. No.: WO2016/017112
PCT Pub. Date: Feb. 4, 2016

(65) Prior Publication Data
US 2017/0216726 A1 Aug. 3, 2017

(30) Foreign Application Priority Data
Aug. 1, 2014 (JP) .................. 2014-157755

(51) Int. Cl.
*A63F 13/45* (2014.01)
*A63F 13/56* (2014.01)
(Continued)

(52) U.S. Cl.
CPC ............ *A63F 13/56* (2014.09); *A63F 13/537* (2014.09); *A63F 13/67* (2014.09); *A63F 13/822* (2014.09)

(58) Field of Classification Search
CPC ........ A63F 13/56; A63F 13/537; A63F 13/67; A63F 13/822
See application file for complete search history.

(56) References Cited

U.S. PATENT DOCUMENTS 8,558,792 B2* 10/2013 Momose ................. A63F 13/10
345/162
2004/0209684 A1* 10/2004 Hisano .................... A63F 13/10
463/32
(Continued)

FOREIGN PATENT DOCUMENTS

JP 2006-115972 A 5/2006
JP 2009-136411 A 6/2009
(Continued)

OTHER PUBLICATIONS

JP2013-121487 Patent Translation to English pdf, pp. 1-30.*
(Continued)

*Primary Examiner* — Omkar A Deodhar
*Assistant Examiner* — Shauna-Kay Hall
(74) *Attorney, Agent, or Firm* — IP Business Solutions, LLC

(57) ABSTRACT

The disclosure describes a game system equipped with a game space generating unit generating a virtual game space where the character acts, displays on a display unit connected to a game system together with the character acting in the game space, a character control unit which controls the character's action in the game space, a storing unit which stores a plurality of action pattern routines providing a predetermined action pattern of the character; and an action pattern set generating unit which generates an action pattern set of the character by reading a plurality of action pattern routines from the storing unit and selects more than two action pattern routine from the plurality of action pattern routines determining the order to perform and determining (Continued)

an action modification condition to modify the action pattern routine to be exercised from the selected action pattern routine from more than two action pattern routines.

18 Claims, 5 Drawing Sheets

(51) Int. Cl.
*A63F 13/822* (2014.01)
*A63F 13/537* (2014.01)
*A63F 13/67* (2014.01)

(56) References Cited

U.S. PATENT DOCUMENTS

| | | | | |
|---|---|---|---|---|
| 2004/0259617 | A1* | 12/2004 | Machida | A63F 13/10 |
| | | | | 463/5 |
| 2006/0030384 | A1* | 2/2006 | Yoshizawa | G07F 17/3209 |
| | | | | 463/7 |
| 2007/0265045 | A1* | 11/2007 | Takai | A63F 13/10 |
| | | | | 463/8 |
| 2014/0011585 | A1 | 1/2014 | Ando et al. | |
| 2015/0251087 | A1* | 9/2015 | Nishino | A63F 13/2145 |
| | | | | 463/31 |

FOREIGN PATENT DOCUMENTS

| | | |
|---|---|---|
| JP | 2010-88674 A | 4/2010 |
| JP | 2011-110343 A | 6/2011 |
| JP | 2013-121487 A | 6/2013 |
| JP | 2014-12051 A | 1/2014 |

OTHER PUBLICATIONS

JP2006-115972 Patent Translation to English pdf, pp. 1-22.*
Internal Search Report dated Aug. 25, 2015 issued in corresponding International application No. PCT/JP2015/003656.

* cited by examiner

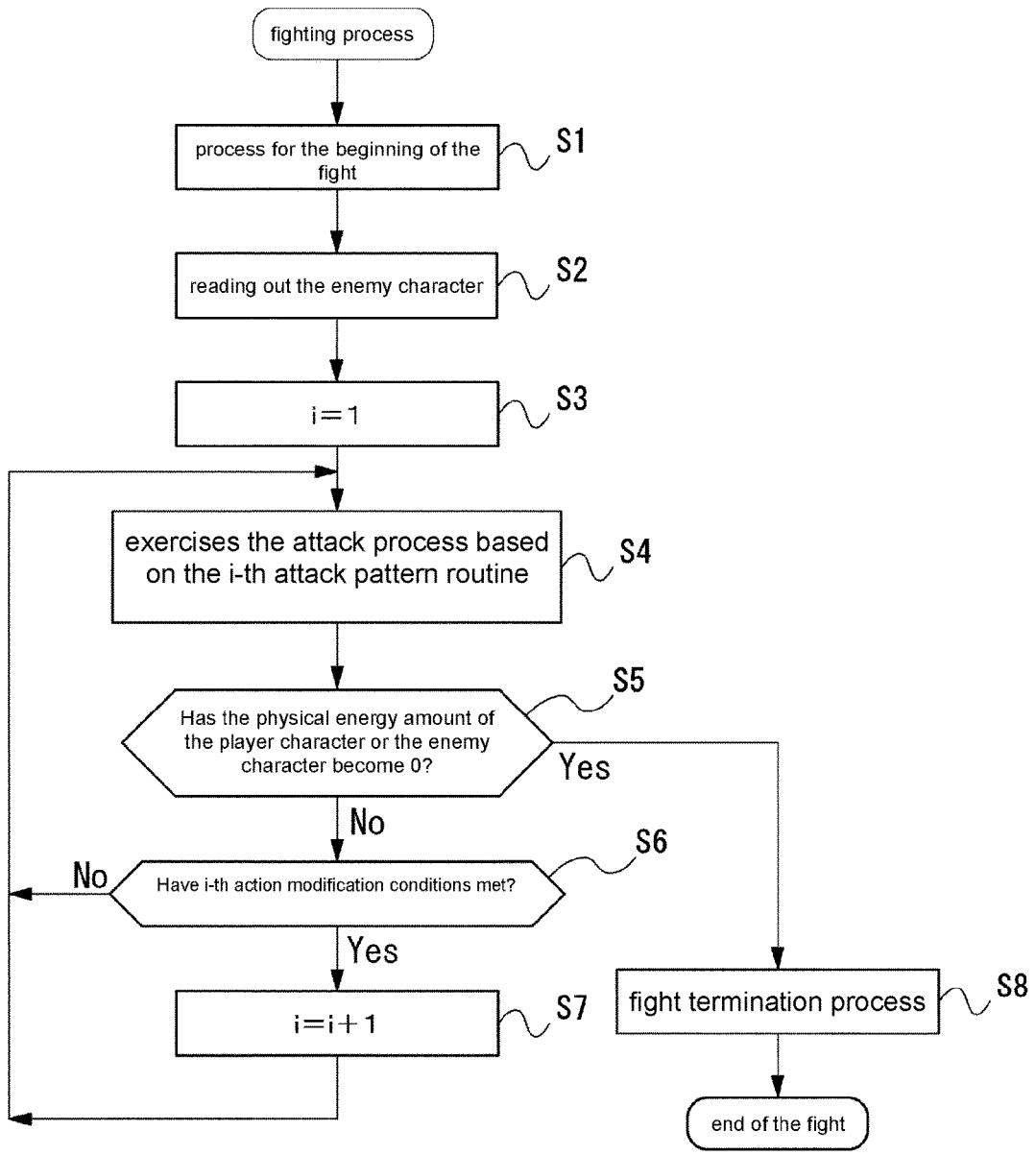

GAME SYSTEM, ITS CONTROL METHOD AND A NON-TRANSITORY STORING MEDIA READABLE ON A COMPUTER DEVICE

TECHNICAL FIELD

The present invention relates to a game system which controls an action of a character in a virtual game space, its control method, and a non-transitory storing media readable on a computer device.

BACKGROUND OF THE INVENTION

An existing game makes a player act within a virtual game space according to an operation of a user, such as an action game or a role-playing game.

In these types of game, various kinds of non-player character such as an enemy character appear and each character act according to various action patterns.

Especially, for example, as written in a patent literature 1 the action pattern changes according to the change in the amount for a predetermined parameter such as physical energy amount for a single character.

PRIOR ART

Patent Literature

Patent literature 1: Japanese Laid-Open Patent Application Publication No. 2010-88674

SUMMARY OF INVENTION

Technical Problem

The existing game produces a series of action pattern data for each of the characters.

If the action pattern is modified such as in a different stage, a series of the action pattern data is separately produced not only in a case where a category of a character is different but also in a case when a category of a character is the same.

For example, there are some issues as explained hereunder in a game with a plurality of stages, when a boss character which is fought at the very end of a stage is the same type regardless of which stage, or when the game is repeatedly played with certain success in the same stage in which the same type of characters as boss characters exist.

That means that there is a risk that the action pattern of the boss character may be anticipated by the users since the variety of the action patterns of the boss character is fixed no matter how many times the users fight against the boss character.

As a result of this, the degree of difficulty decreases and there is nothing fresh about playing the game.

On the other hand, if one tries to diversify the action pattern of the character, the quantity of data will increase as well as its development cost.

The present embodiment provides a game system, its control method, and a non-transitory storing media readable on the computer device which enables to save the development cost and to diversify the action of the character.

Solution of Problem

The game system related to the present invention has a game space generating unit generating a virtual game space where a character acts and displaying the game space together with the character acting in the game space on a display unit connected to the game system, a character control unit controlling the character's action in the game space, and an action pattern set generating unit which generates an action pattern set of the character by reading a plurality of action pattern routines which provide a predetermined action pattern of the character and selects more than two action pattern routines from the plurality of action pattern routines, determining the order to perform such action and determining an action modification condition to modify the action pattern routine to be exercised from the selected action pattern routine from more than two action pattern routines.

The character control unit controls the action of the character based on the generated action pattern set.

Effect of the Invention

It is possible for the present embodiment to provide the game system, its control method, and a non-transitory storing media readable on the computer device which enables to save the development cost and to diversify the action of the character.

BRIEF DESCRIPTION OF THE DRAWINGS

FIG. 5 is a flow chart illustrating the flow of the control of a fighting process in the present of embodiment.

DESCRIPTION OF EMBODIMENTS

Figure 1:
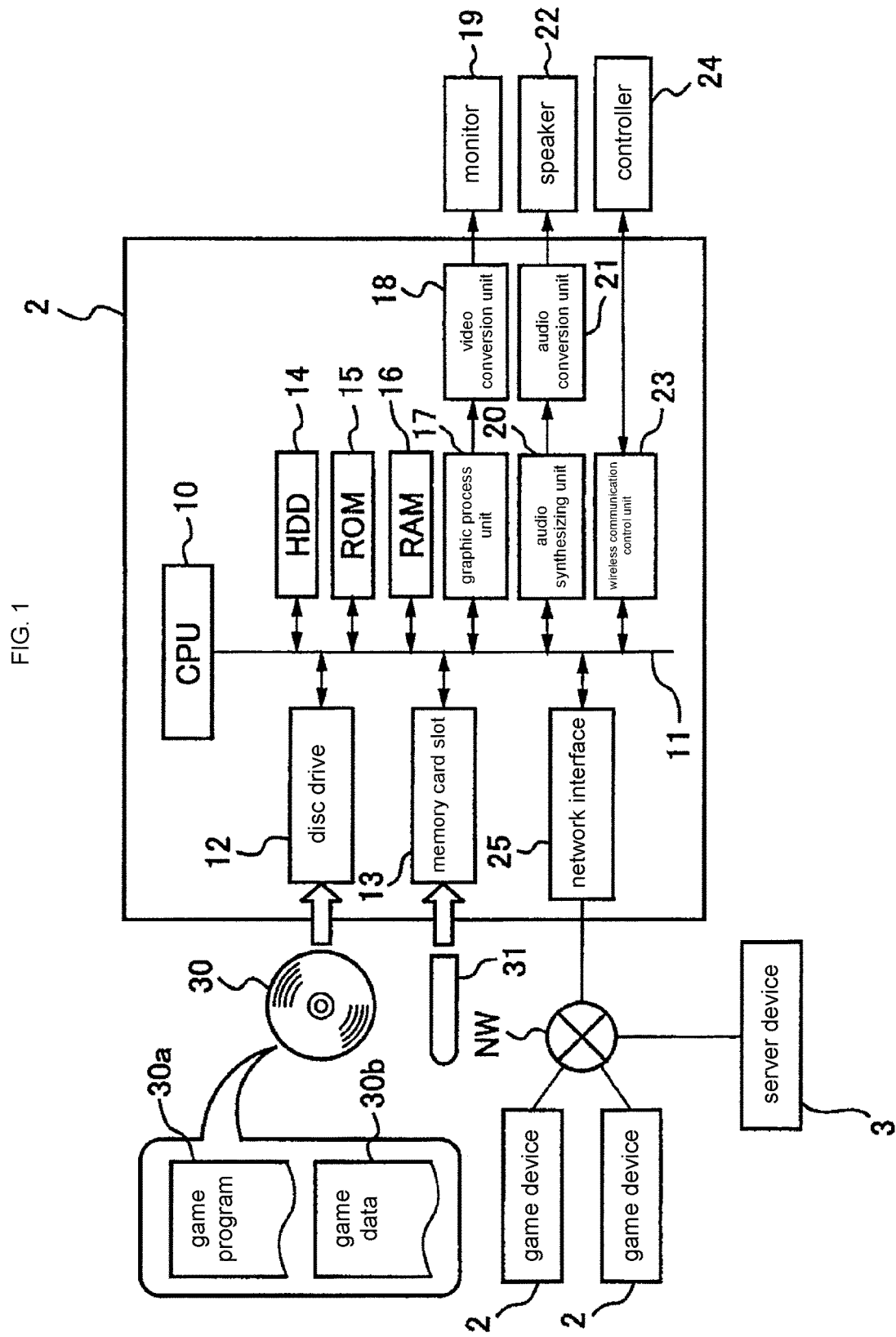
FIG. 1 is a block diagram illustrating a hardware configuration of the game device of an aspect of the present invention.

The game system related to the present invention has the game space generating unit generating the virtual game space where the character acts and displaying the game space together with the character acting in the game space on a display unit connected to the game system, the character control unit controlling the character's action in the game space, a storing unit storing a plurality of action pattern routine providing a predetermined action pattern of the character and the action pattern set generating unit which generates an action pattern set of the character by reading a plurality of action pattern routines from the storing unit and selects more than two action pattern routines from the plurality of action pattern routine, determining the order to perform such action and determining an action modification condition to modify the action pattern routine to be exercised from the selected action pattern routine from more than two action pattern routines.

The character control unit controls the action of the character based on the generated action pattern set.

The plurality of action pattern routines are applicable to more than two characters and more than two characters include a first character and a second character.

The number of the action pattern routines and/or the order of the action pattern included in the action pattern set may be different between the first character and the second character.

The game system has a determination unit determining whether or not the action modification condition has been met.

The character control unit may modify the action pattern routine to be performed when the determination unit has determined that the action modification condition is met.

The action modification condition may be met when the predetermined amount of parameter regarding the character's status is within a predetermined range.

The game system has an indicator display unit which displays an indicator indicating the change in the parameter amount of the character, which is displayed on the display unit.

The indicator may display a border between an area where the action pattern routine is exercised before it is modified and an area where the action pattern routine is exercised after it is modified.

The action modification condition may be different between the first character and the second character.

A game system control method related to the other aspect of the present invention has a game space generating step generating a virtual game space where the character acts and displaying the game space together with the character acting in the game space on the display unit connected to the game system, a character control step controlling the character's action in the game space and an action pattern set generating step included in the game data which is possible to be read out in the afore mentioned game system and generates the action pattern set of the character by reading out a plurality of action pattern routines and selects more than two action pattern routines and selects more than two action pattern routines from the plurality of action pattern routines determining the order to perform such action and determining the action modification condition in order to modify the action pattern routine to be exercised from the selected action pattern routine from more than two action pattern routines.

The character control step controls the action of the character based on the generated action pattern set.

The non-transitory storing media readable on the computer device related to the other aspect of the present invention which stores an executable instruction by the control unit in the computer device includes the game space generating step generating a virtual game space where the character acts and displaying the game space together with the character which acts in the game space on the display unit connected to the computer device, the character control step controlling the action of the character in the game space and the action pattern set generating step included in the game data which is possible to be read out in the afore mentioned computer device and generates the action pattern set of the character by reading out a plurality of action pattern routines and selects more than two action pattern routines providing the predetermined action pattern of the character, selects more than two action pattern routines from the plurality of action pattern routines determining the order to perform such action, and determining the action modification condition in order to modify the action pattern routine to be exercised from the selected action pattern routine from more than two action pattern routines.

The character control step controls the action of the character based on the generated action pattern set.

The game system, its control methods and a non-transitory storing media readable on the computer device related to the present embodiment is explained by referring to figures.

[Summary of the Game]

The following explanation explains an action game performed in a home video game device.

The action game related to the present embodiment progresses by searching an item or conquering an event through fighting with the enemy character by operating the player character within the virtual game space.

The game in the present embodiment progresses a scenario with setting a predetermined goal (main story of the game) by operating the player character by the users. The scenario includes a plurality of stages and the game is progressed by proceeding the plurality of stages according to the order.

The condition for completing the game is set for each of the plurality of stages.

The stage means a break point in the main story for the game within the scope of this specification and the claim.

For example, the stage includes a break point according to the contents of the game such as a "chapter" which is a break point according to the progress of the story or an action place, a "round" which is a breakpoint according to a number of times the game is played.

The enemy character which interrupts the progress of the player character appears in each stage which establishes the main story of the game.

The scenario progresses by each users attacking and defeating the enemy character through operating the player character. A plurality of stages where a boss character appears at the very end of each stage which is the character of the same category is included in the game. The character of the same category means a character with the same or slightly different appearance (such as the difference in the color of each parts, the shape of the predetermined parts, or its accessories). In other words, the character with the same category means a character with the same or a similar body shape or a possible action (walk, fly, etc.).

[Hardware Configuration]

The configuration of the game device which performs the above mentioned game is explained, as follows.

The game system in the present embodiment is constituted of an external device such as a monitor 19, a speaker 22, and a controller 24 which are connected to the game device 2.

The game system may perform the game based on a game program 30*a* and a game data 30*b* which are read in from the following disc-shaped storing media 30.

However, in order to make the explanation brief, the game system may be indicated as simply the game device 2.

FIG. 1 is a block diagram illustrating a hardware configuration of the game device 2 of the aspect of the present invention As illustrated in FIG. 1, the game device 2 is connectable between the other game device 2 and a server device 3 through a communication network NW such as Internet or Local Area Network (LAN).

The game device 2 has a central processing unit (CPU) 10 which controls its action.

A disc drive 12, a memory card slot 13, a Hard Disk Drive (HDD) 14 which constitutes a program storing unit, a Read Only memory (ROM) 15 and a Random Access Memory (RAM) 16 are connected to the CPU 10 through a bass 11.

Moreover, a graphic process unit 17, an audio synthesizing unit 20, a wireless communication control unit 23, and a network interface 25 are connected to CPU 10 through the bass 11.

The graphic process unit 17 draws a game screen image including the game space or each of the characters according to the instruction of the CPU 10.

The external monitor 19 is connected to the graphic process unit 17 via a video conversion unit 18.

The game screen image drawn at the graphic process unit 17 is converted to a video format and displayed on the monitor 19.

The audio synthesizing unit 20 plays and synthesizes a digital game sound according to the instruction of the CPU 10.

The external speaker 22 is connected to the audio synthesizing unit 20 via an audio conversion unit 21.

Therefore, the game sound played and synthesized the audio synthesizing unit 20 is decoded to an analog format at the audio conversion unit 21 and output externally from the external speaker 22.

The wireless communication control unit 23 has a wireless communication routine with a 2.4 GHz band and is connected to the controller 24 by wireless transmission which is attached to the game device 2, and is able to send and receive the data.

The users can input a signal to the game device 2 by controlling a device (not illustrated in the figure) such as a button set up on the controller 24, and can control the action of the player character displayed on the monitor 19.

Moreover, the network interface 25 connects the game device 2 to the communication network NW such as Internet or LAN.

This enables the game device 2 to communicate with the other game device 2 or the server device 3.

It is possible for each game device 2 to display a plurality of player characters in the same game space with synchronization by connecting the game device with the other game device 2 through the communication network NW and by sending and receiving the data to each other.

Therefore, it is possible for the game device 2 to perform a multiplayer game being progressed by cooperating with a plurality of people.

[Data Structure]

An action pattern group 50 which is common to more than two characters (the character with the same category) is included in the game data 30b as a data configuring the action pattern set of the enemy character which is a non-player character.

Figure 2:
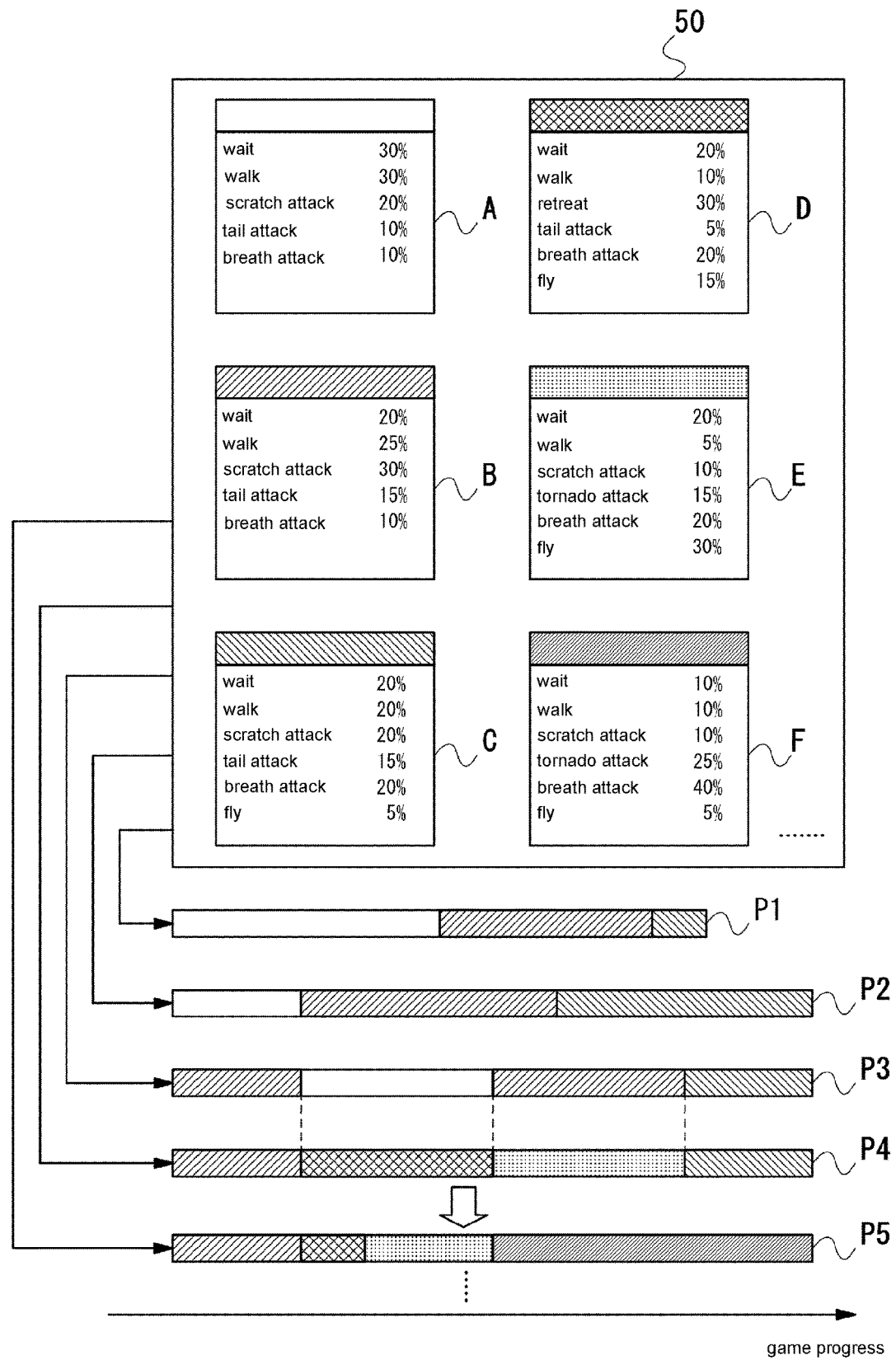
FIG. 2 is a pattern diagram illustrating a data structure of the character in the present embodiment.

FIG. 2 is a pattern diagram illustrating a data structure of the character in the present embodiment.

A plurality of action pattern routines A to F which provide the predetermined action pattern of the character is included in the action pattern group 50.

As explained hereafter, the action pattern of the character is determined by the action pattern set generated from more than two action pattern routines A to F included in the action pattern group 50.

Therefore, a plurality of the action pattern routines A to F included in one single action pattern group 50 is applicable to more than two characters.

The explanation hereto will be made based on the predetermined action pattern of a dragon which is the boss character of the enemy.

A plurality of action pattern routines A to F include a probability table which sets a probability for performing a plurality of predetermined actions for each of the action pattern routines.

For example, an action pattern routine A mainly performs a scratch attack which is a close range attack and the probability for performing a predetermined action other than an attack is relatively high and is relatively gentle.

An action pattern routine B has a higher probability for performing an attack even though it has the same predetermined action as the action pattern routine A.

An action pattern routine C includes a flight action in addition to the predetermined action of the action pattern routine B.

Moreover, the action pattern routine C has a higher probability to spit out fire which is a powerful attack out of multiple attacking means.

An action pattern routine D includes a retreat instead of a scratch compare to the action pattern routine C.

The action pattern routine D mainly attack from a far distance, compared to other action pattern routines.

An action pattern routine E has a higher probability to fly, and a tornado which is a special attack, is added to the action.

An action pattern routine F mainly spit out fire and performs a tornado attack.

The action pattern routine F has the highest probability to perform an attack.

Moreover, the action pattern routines A to F not only have a probability to perform a predetermined action but also establish a factor such as an appearance of the character (raise/lower the arm, bend over/lift one's chest up, change of the expression, etc.) and/or amount of a parameter indicating the status of the character (attacking power, defensing power, etc.).

For example, the action pattern routine B may set its movement speed faster than the action pattern routine A.

In addition to this, for example, the action pattern routines E and F which perform the tornado attack may have an aspect which the expression of the character shows anger.

The action pattern group 50 need not to be set to all non-player characters.

For example, the action pattern group 50 may be set only to the boss character appearing for a plurality of times or for a plurality of types (such as the dragon) and a single or a plurality of action patterns may be set to each character for the other enemy characters.

[The Functional Configuration of the Game Device]

Figure 3:
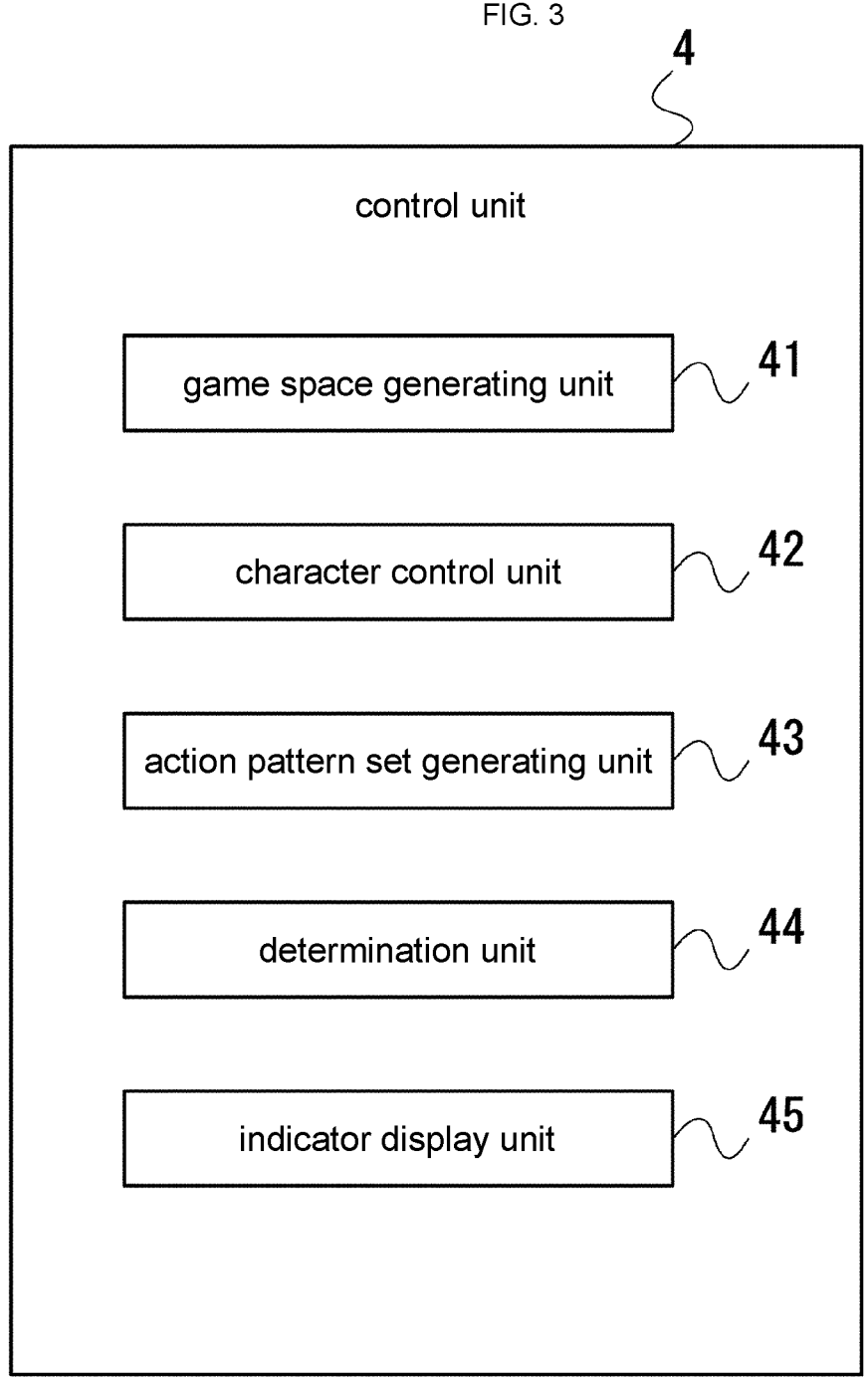
FIG. 3 is a block diagram illustrating a functional configuration of the game device as illustrated in FIG. 1.

FIG. 3 is a block diagram indicating the functional configuration of the game device 2 as illustrated in FIG. 1. As illustrated in FIG. 1, the game device 2 performs as a computer with a control unit 4 including the CPU 10, the HDD 14, the ROM 15, the RAM 16, the graphic process unit 17, the video conversion unit 18, the audio synthesizing unit 20, the audio conversion unit 21, a network interface 25. As illustrated in FIG. 3, the control unit 4 of the game device 2 may be able to render a game space generating unit 41, a character control unit 42, an action pattern set generating unit 43, a determination unit 44, and indicator display unit 45 function by executing the game program 30a of the present invention.

The game space generating unit 41 generates a virtual game space where the player character acts. The game space where the player character and the enemy character fight each other is included in this game space. The game space generating unit 41 displays the game space together with the character moving within the game space to the monitor 19 connected to the game device 2 which is a computer. The game space generating unit 41 reads out the data such as an object and a texture included in the game data 30b and generates a three-dimensional virtual game space, according to the movement of the player character.

Moreover, the game space generating unit 41 generates a two-dimensional image shoot by a predetermined virtual camera in order to display the game space to the monitor 19 of the game device 2. The character control unit 42 controls the movement of the character in the game space according to the operation of the controller 24 or the game progress status of the users.

Moreover, the character control unit 42 controls the movement of the non-player character moving within the virtual game space.

In the present embodiment, the enemy character which attacks each player's character is included in the non-player character.

The action pattern set generating unit 43 reads out a plurality of action pattern routines A, B, C, D, E and F (hereafter "the plurality action pattern routines") included in the game data 30*b* and generate a plurality of characters' action pattern sets P1, P2, P3, P4 and P5 (hereafter "the plurality of action pattern sets").

More specifically, the action pattern set generating unit 43 selects more than two action pattern routines from the plurality of action pattern routine.

Moreover, the action pattern set generating unit 43 generates the plurality action pattern sets by determining the action modification conditions in order to modify the selected exercise order of more than two action pattern routines and the action pattern routine.

The character control unit 42 controls the character's action based on the plurality action pattern sets.

As explained here above, the plurality of action pattern routines are included in the action pattern group 50 which is common to more than two characters in the present embodiment.

A first character or a second character may be included in more than two characters.

For example, the first character is a blue dragon as explained hereafter and the second character is a silver dragon as explained hereafter.

In addition to this, the number of action pattern routine and/or the exercise order included in the action pattern set may differ between the first character and the second character.

The action modification conditions may also differ between the first character and the second character.

For example, the action is controlled based on an action pattern set P1 for the blue dragon which is the boss character for stage 1.

The action is controlled based on the action pattern set P2 for the red dragon which is the boss character for stage 2.

The action is controlled based on the action pattern set P3 for the silver dragon which is the boss character for stage 3.

The action pattern set P1 includes the action pattern routine A, B and C and the predetermined action pattern is modified according to this order.

A first action modification condition to modify from the action pattern routine A to action pattern routine B, and a second action modification condition to modify from the action pattern routine B to action pattern routine C are set in the action pattern set P1.

The action pattern set P2 includes the action pattern routines A, B, and C which are the same as the action pattern set P1 and the modification order for the predetermined action pattern are also the same.

However, the maximum amount of the parameter (for example the amount for the physical energy), which is the basic standard for the action modification conditions explained hereafter, is larger than the blue dragon which is controlled based on the action pattern set P1.

Threshold amount for the parameter which is determined as the first action modification condition and the second action modification condition for the action pattern set P2 is different from the action pattern set P1.

As a result from these, the term for a high probability for performing a stronger attack is longer for the red dragon compared to the blue dragon, and the degree of difficulty to conquer will rise.

The action pattern set P3 has the same type of action pattern routine to be selected and the maximum amount of parameter determined as the action modification condition is the same as the action pattern set P2.

However, the action pattern set P3 has a different order and the different number of times for the modification of the action pattern routine.

More specifically, the action pattern set P3 modifies the order for the action pattern routine as B, A, B, C.

In the silver dragon where it is controlled based on such action pattern set P3 has a higher probability for exercising a strong attack from the beginning but after that temporarily weakens by the decrease of probability to attack.

The determination unit 44 determines whether the action modification conditions are met during the game.

The character control unit 42 modifies its action pattern routine when the determination unit 44 determines that the action modification conditions are met.

For example, the action modification conditions are to have the amount for the predetermined parameter regarding the status of the character within the predetermined range.

For example, physical energy amount is adopted for the amount for the predetermined parameter.

However, the amount for the parameter adopted as the action modification conditions may be set other than the physical energy amount.

For example, amount for the parameter may be amount for a stamina consumed every time the character performs the attack or amount for a time counter which counts the time from the beginning when the fight with the character started.

If the amount for the physical energy is adopted as the amount for the parameter for the basic standard for the action modification conditions, the first action modification condition shall be below 50% of the maximum amount for the physical energy in the blue dragon where it is controlled based on the action pattern set P1.

Also, the second action modification condition shall be below 10% of the maximum amount for the physical energy.

That means that the blue dragon will be controlled based on the action pattern routine A when the amount for the physical energy is on and over 50% of its maximum amount.

The blue dragon will be controlled based on the action pattern routine B when the amount for the physical energy is on and over 10% of its maximum amount and under 50%.

The blue dragon will be controlled based on the action pattern routine C when the amount for the physical energy is below 10% of its maximum amount.

In the same way, the red dragon will be controlled based on the action pattern set P2.

For example, the first action modification condition shall be below 80% of the maximum amount for the physical energy.

The second action modification condition shall be below 40% of the maximum amount for the physical energy.

In the same way, in a case in which the silver dragon is controlled based on the action pattern set P3, for example, the first action modification condition to modify from the action pattern routine B to the action pattern routine A is the amount for the physical energy being below 80% of its maximum amount.

The second action modification condition to modify from the action pattern routine A to the action pattern routine B shall be below 50% of the maximum amount for the physical energy.

The third action modification condition to modify from the action pattern routine B to the action pattern routine C shall be below 20% of the maximum amount for the physical energy.

In the character which the predetermined action pattern could be shared, more than two action pattern set will be generated by paring a plurality of action pattern routines from the action parameter group 50.

Therefore it is possible to generate the character with a different action pattern set more easily and with a lower cost.

Moreover it is also possible to set freely the number or the order of the action pattern routine incorporated in the action pattern set, or the action modification conditions.

Therefore, it is possible to easily increase the variation of the action pattern by holding the increase of the quantity of the data.

In addition to this, in an online game, it is possible to modify or add the action pattern routine or to generate a new action pattern set upon the update after the play has started, with more ease and with a lower cost.

These action modification conditions will be displayed on the game screen in the present embodiment.

Moreover, the indicator display unit 45 displays on the game screen the indicator which shows the change in the amount of parameter for the character displayed on the game screen.

Figure 4:
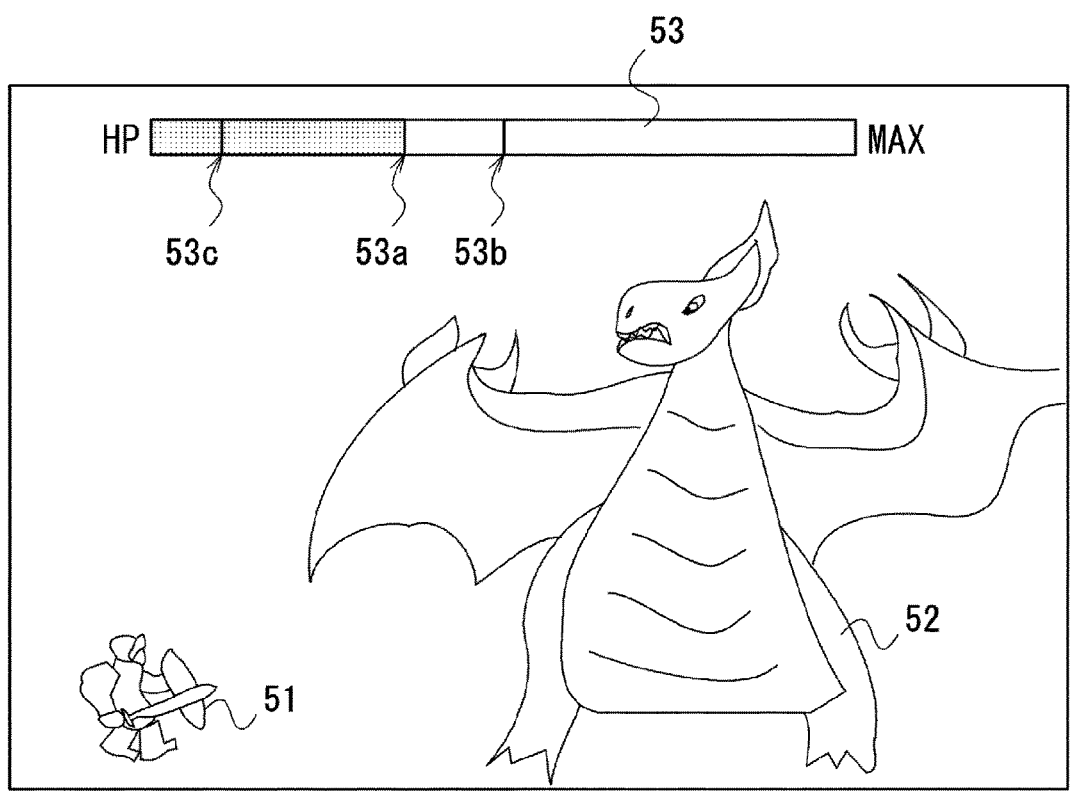
FIG. 4 is a schematic view illustrating an example of a game screen in the present embodiment.

FIG. 4 is a schematic view illustrating one example of the game screen in the present embodiment.

As illustrated in FIG. 4 a player character 51 or an enemy character (red dragon) 52 operated by the users are displayed on the game screen.

Moreover, an indicator 53 indicating the change in the physical energy amount which is the amount for the parameter of the enemy character is also displayed on the game screen.

The indicator 53 illustrated in FIG. 3 displays the physical energy amount to be decreased from the maximum amount (the right end) to 0 (the left end) by the attack from the player character 51.

The indicator 53 is displayed with a different color for the left side and the right side, having the present physical energy amount 53*a* as the border.

Moreover, the border between the area where the action pattern routine before the modification is exercised and the area where the action pattern routine after the modification is exercised is displayed on the indicator 53.

More specifically, a first threshold amount indicator 53*b* indicating the threshold amount for the first action modification condition (50% of the maximum amount) and a second threshold amount indicator 53*c* indicating the threshold amount for the second action modification condition (10% of the maximum amount) are displayed on the indicator 53.

It is possible to notify the users of the change in the predetermined action pattern (the action pattern routine) of the enemy character 52 by displaying the indicator 53 on the game screen.

Therefore, it is possible to provide the users of the hint for conquering the game.

As explained here above, the indicator 53 may not only be displayed by the threshold indicator 53*b* and 53*c* which indicates the threshold amount of the action modification condition but also may be displayed by a different color by the action pattern routine.

The indicator such as the player character's physical energy amount or any other amount may be displayed on the game screen.

[Other Aspects of the Action Modification Conditions]

The action modification conditions are not limited to the amount for the parameter explained here above.

For example, the action modification condition may be set based on the status of the player character.

For example, the action pattern routine may be modified by the physical energy amount, a magic point in order to use a magic, or any other amount.

The action modification condition may also be set based on the status of the surrounding environment.

For example, the action pattern routine may be modified by whether the predetermined object is placed to the predetermined position or not (for example whether a pole is fallen or not), whether the status of the predetermined object has been changed or not (for example whether a lamp is lit or not), or by any other conditions.

Moreover, even if it is the same action pattern set as the same enemy character, an action pattern set different according to the number of players for the online multiplayer game in a predetermined timing (the number of player characters existing in the predetermined virtual space area during the timing) during the beginning of the fight in the game in which the multiplayer game is playable as in the present embodiment, may be adopted.

For example, in the above example, the character control unit 42 controls the silver dragon based on the action pattern set P3 as described here above, if the number of people for the multiplayer game at the beginning of the fight with the silver dragon is below the number of people for the predetermined threshold amount.

If the number of people is equal to or more than the threshold amount, then the silver dragon is controlled based on a different action pattern set P4.

The action pattern set P4, for example, includes the action pattern routines B, D, E and C and changes the predetermined action pattern in this order. In the action pattern set P4, the probability for performing a ranged attack or a flight action will become higher and the enemy character will act from a distant position from the player character more frequently.

Therefore, a game element will change according to the number of players for the multiplayer game.

Moreover, it will become more difficult for the player character to conduct the close range attack to the enemy character and the degree of difficulty will become higher.

As a result of this, a more cooperative play between the player characters will be required.

Each action modification conditions of the action pattern set P4 is the same as the action pattern set P3 in the example for the FIG. 2.

That means that the character control unit 42 modifies the action pattern routine from B to D when the physical energy is below 80% of its maximum amount. The action pattern routine will be modified from D to E when the physical energy becomes below 50% of its maximum amount. The action pattern routine will be modified from E to C when the physical energy becomes below 20% of its maximum amount.

Each threshold amount for the parameter which is set as the action modification condition in the action pattern set P4 may vary.

The character control unit 42 may determine the action pattern set of the enemy character during the fight from a plurality of the action pattern set by drawing at a predetermined timing at the beginning of the fight.

In this case, the strategy to conquer the quest may change every time since the action pattern set changes every time even the player comes across the same enemy character and fights against it.

Moreover, in this case, the reward may differ according to the determined action pattern set in the game where the reward such as an item or an experience point is provided to the player character after the end of the fight (victory).

As a result of this, the users may be able to determine whether or not they could earn the desired reward by figuring out the action pattern of the enemy character and determine whether to choose to fight or not, since the reward varies according to the action pattern set of the enemy character even if the users are fighting against the same enemy character.

Moreover, the character control unit 42 may control the enemy character based on the action pattern set different from the action pattern set before meeting the action modification conditions when the predetermined action modification conditions are met during facing (fighting) with the enemy character.

For example, if the predetermined action modification conditions are met in a status where the action of the silver dragon is controlled based on the action pattern set P4 (this could be action pattern set P3), the action pattern set generating unit 43 modifies the action pattern set of the silver dragon from P4 to P5 and the character control unit 42 controls the action of the silver dragon based on the action pattern set P5 which is different from the action pattern set P4.

The cases such as when a column falls down, when there is a change of status in the surrounding object (fixed object) such as when the lamp is lit, when the user character succeeds to perform a specific attack to the enemy character, when the damage amount of the specific part of the enemy character is more than the predetermined threshold amount, when the player character received a specific attack from the enemy character, etc., are included in the action modification conditions to shift the action pattern set P4 to the action pattern set P5.

The action pattern set P5, for example, includes the action pattern routines B, D, E and F and modifies the predetermined action pattern in this order.

Even in the action pattern set P5, the action modification condition to modify from one attack pattern routine to the next action pattern routine shall have the amount for the parameter (the amount for the physical energy) as the basic standard as same as the action pattern set P4.

The character control unit 42, which modifies the action pattern routine from B to D when the physical energy is below 80% of its maximum amount, modifies the action pattern routine from D to E when the physical energy becomes below 70% of its maximum amount and modifies the action pattern routine from E to F when the physical energy becomes below 50% of its maximum amount.

In a case in which the action pattern set of the silver dragon is modified from P4 to P5, the action pattern routine which becomes the first basic standard after the modification out of the action pattern routines B, D, E and F included in the action pattern set P5 differs according to the amount of the parameter (the present amount for the physical energy) of the silver dragon right after the modification (before the action taken for the first time based on the action pattern set P5 and after the modification of the action pattern set).

For example, when there is no modification for the amount for the physical energy before and after the modification of the action pattern set, if the physical energy for the silver dragon just before the modification is 40% of its maximum amount, the action of the silver dragon is controlled based on the action pattern routine D with a high probability for exercising a ranged attack, in the action pattern set P4 before the modification.

However, the action of the silver dragon is controlled based on the action pattern routine E with a high probability for exercising a flight action, in the action pattern set P5 after the modification.

The action of the silver dragon may be controlled based on the action pattern routine according to the amount for the physical energy after its increase or decrease at the time of the modification of the action pattern set.

In the action pattern set P5 the probability for a strong tornado and spewing out flames becomes higher and the degree of difficulty will rise.

Moreover, it is possible to diversify the action of the enemy character since the action pattern modifies based on a different condition from the amount for the parameter which is visualized as the indicator 53.

These action modification conditions which are different from the amount for the parameter may also be visualized on the game screen.

For example, specific parts will shine when modifying the action pattern set according to the damages on such specific parts of the enemy character.

When the attack of the player character hits such specific parts, a damage expression may be made differently from when the attack hits other parts of the enemy character.

The following explains the case in which the threshold amount to modify the action pattern routine from the previous action pattern routine to the present action pattern routine exceeds, where the amount for the parameter which is the basic standard for the action modification conditions of the enemy character increases or decreases.

For example, in the case when the amount for the physical energy of the enemy character recovers, the character control unit 42 may return to the previous action pattern routine or may not return to such action pattern routine when the amount for the physical energy recovers more than the previous threshold amount of the action modification conditions.

The character control unit 42 may prohibit the change in the amount for the parameter which changes by exceeding the previous threshold amount.

The data for each of the action pattern routines A to F of the action pattern group 50 where a plurality of action patterns are shared and information for each characters regarding each action pattern set which has been allocated to each characters (category of the action pattern routine, its order and the action modification condition) are included in the first aspect of the action pattern data for the enemy character stored as the game data 30b.

That means that information of the action pattern routine adopted for each of the characters is stored in the address of one character in the game data 30b, but the data of the action pattern routine itself is stored in a different address as a shared data among the characters.

When reading out the characters, first of all, the action pattern set generating unit 43 reads the information of the characters corresponding to the game data 30b and is able to generate the action pattern set of the characters by reading the data of the corresponding action pattern routine from the shared action pattern group 50 based on the information of the characters which has been read.

The timing for reading in the data of the action pattern routine may be read in collectively when reading in one single character or may be read in sequentially the action pattern routine after the modification at the timing of modifying the action pattern routine (the timing when the action modification conditions are met).

In this case, it is possible to keep the amount of the data low, since it is only required to store each data for the action pattern routine included in the action pattern group 50 one by one as the game data 30*b*.

On the other hand, information for each action pattern set corresponding to each of the characters and the data for each action pattern routine included in the corresponding action pattern set are included in the second aspect of the action pattern data for the enemy character stored as the game data 30*b*.

That means that the information and the data of a plurality of action pattern routines adopted for the character is stored in the address of the character in the game data 30*b*, with the order to read out each action pattern routine and with its conditions.

The action pattern set generating unit 43 is able to generate the action pattern set of the characters by reading in the data stored in the address and accessing the address of the character to be read in the game data 30*b*.

In this case, it is possible to accelerate the speed for reading in the data; however, the amount of the data might increase when comparing to the first aspect.

[The Flow for the Fighting Process]

The flow for the control of the fighting process of the present embodiment is explained hereunder.

FIG. 5 is a flowchart illustrating the flow for the control of the fighting process of the present embodiment.

The control unit 4 exercises the process for the beginning of the fight when the player character performs an action which meets the predetermined condition such as whether or not the player character is at the predetermined map location, and whether or not the player character moves a predetermined object (Step S1).

In the process for the beginning of the fight, the game space generating unit 41 displays the fighting game screen or read out the Back Ground Music (BGM) during the fight.

Moreover, the action pattern set generating unit 43 generates the action pattern set of the enemy character.

The game space generating unit 41 reads out the information of the action pattern set of the enemy character and reads out the data for the other enemy characters and based on the information and data, displays the enemy character on the game screen (Step S2).

The character control unit 42 sets a flag i to 1 which is an initial value (Step S3).

Subsequently, the character control unit 42 exercises an attack process based on an i-th attack pattern routine from the data read out from the enemy character (Step S4).

At first, the action of the enemy character is controlled based on i=1 attack pattern routine.

For example, if it is the red dragon, the attack process based on the action pattern routine A will be exercised.

There is a collision determination area for each object of the player character and the enemy character.

The character control unit 42 exercises the attack process to calculate the amount of the damage for both the player character and the enemy character when the attacking means of the other characters such as a weapon is placed within the collision area.

As a result of the attack process, the character control unit 42 determines whether the physical energy amount of the player character or the enemy character has become 0 (Step S5).

If the physical energy amount of either of the characters becomes 0 (if Yes to Step S5), the character control unit 42 exercises a fight termination process (Step S8).

If the physical energy amount of the player character becomes 0, the character control unit 42 exercises a game over process as the fight termination process.

If the physical energy amount of the enemy character becomes 0, the character control unit 42 provides a predetermined reward to the player character as the fight termination process and exercises a fight victory process to erase the enemy character from the game screen.

If the physical energy amount of neither of the character becomes 0, the fight will continue.

The determination unit 44 determines whether the i-th action modification conditions are met (Step S6)

For example, if i=1, the determination unit 44 determines whether or not the first action modification conditions have been met.

If the determination unit 44 determines that action modification conditions are not met (if No to Step S6) the character control unit 42 exercises the attack process based on the same action pattern routine exercised for the previous time (Step S4).

If the determination unit 44 determines that action modification conditions are met (if Yes to Step S6), the character control unit 42 exercises a process to add 1 to a flag i (i=i+1) (Step S7) and exercises the attack process based on the i-th attack pattern (Step S4).

That means that in the attach process, the character control unit 42 exercises the attack process based on the action pattern routine following the basic standard set for the previous attack process selecting from the action pattern routine included in the action pattern set.

Hereafter, the attack process will repeat until the physical energy amount of the player character or the enemy character becomes 0 by repeating a determination process in the same way.

The player character or the enemy character may exercise an escape behavior during the fight.

In this case, the fight termination process will be exercised at the point when the escape behavior is exercised.

As explained here above, the action of the enemy character is controlled based on each of the action pattern set but need not to modify the control flow itself.

Moreover, as explained in the above, it is possible for a plurality of the action pattern sets to generate freely and with a low cost with a combination of and the action modification conditions of the plurality of action pattern routines included in the action pattern group 50.

Therefore it is possible to perform with ease and with a low cost to add and modify the action pattern of the character not only at the time of the creation of a new game program, but also when amending and modifying the game program such as an update.

It is possible to diversify the action of the character by keeping the development cost low by the game program of the present embodiment.

The present embodiment is not limited to the aspects explained here above but also enables various improvements, modifications, and amendments, so long as it is within the scope of the purpose of the present embodiment.

For example, the aspect with an action of each character is controlled based on the different action pattern for the character which differs from each stage has been explained mainly in the above embodiment, but it is not limited to this aspect.

For example, the action of the character may also be controlled based on the action pattern set which differs according to the number of times conquering the game with the same character in the same stage.

In the explanation above, it is explained based on the present embodiment which is determined in advance to have the plurality of the action pattern routines A to F to be included in the action pattern group 50 which is common to the characters with the same category, and it is possible for the plurality of the action pattern routine to be shared among more than two characters.

However it is not limited to this case.

For example, only one action pattern group can be commonly provided for the characters which are generated from the plurality of action pattern routines, regardless of the categories of the characters.

Moreover, the action pattern group, which includes more than one action pattern routines which determines the action pattern for each part, may be set for each part, and the action pattern set which determines the action pattern for more than two characters may be generated by selecting the action pattern routine for the corresponding parts from each action pattern group.

A game system of a non-portable-type has been explained in the above embodiment; however, the present embodiment may also be applied preferably to a portable video game device, a mobile phone, and a computers such as a personal computer.

INDUSTRIAL APPLICABILITY

The present embodiment is very useful in providing a game system, its control method, and a non-transitory storing media readable on the computer device which enables to save the development cost and to diversify the action of the character.

LIST OF REFERENCE SIGNS

2 Game Device (Computer Device)
30a Game Program
30b Game Data
41 Game Space Generating Unit
42 Character Control Unit
43 Action Pattern Set Generating Unit
44 Determination Unit
45 Indicator Display Unit
50 Action Pattern Group
53 Indicator
53b, 53c Threshold Amount Indicator
A to F Action Pattern Routine
P1 to P5 Action Pattern Set

The invention claimed is:
1. A game system comprising:
a game space generating unit generating a virtual game space where first and second characters act and displaying the game space with the first and second characters acting in the game space on a display unit connected to the game system;
a character control unit controlling the first and second characters;
a storage storing a plurality of action pattern routines including first to third action pattern routines, the first action pattern routine including first and second actions, the second action pattern routines including the first action; and
an action pattern set generating unit selecting the first action pattern routine, and determining an action modification condition to replace the first action pattern routine with the third action pattern routine,
wherein the character control unit controls the first character to perform routinely the first and second actions with the second action subsequent to the first action when the first action pattern routine is selected for the first character, and
wherein the character control unit controls the second character to perform the first action when the second action pattern routine is selected for the second character.

2. The game system according to claim 1,
wherein the character control unit controls the second character to perform routinely the first and second actions with the second action subsequent to the first action when the first action pattern routine is selected for the second character, and
wherein the character control unit controls the first character based on at least one of the number of the action pattern routine and an order of the first and second actions.

3. The game system according to claim 1, further comprising
a determination unit determining whether the action modification condition has been met,
wherein the character control unit replaces the first action pattern routine with the third action pattern routine when the determination unit has determined that the action modification condition is met.

4. The game system according to claim 1,
wherein the action modification condition has been met when a predetermined parameter amount regarding a status of the first character is within a predetermined range.

5. The game system according to claim 1, further comprising
an indicator display unit which displays on the display unit an indicator indicating a change in the parameter amount of the first character,
wherein the indicator displays a threshold value for replacing the first action pattern routine.

6. The game system according to claim 2,
wherein the action modification condition for replacing the first action pattern routine of the first character is different from an action modification condition for replacing the first action pattern routine of the second character.

7. A game system control method comprising:
generating a virtual game space where first and second characters act and displaying the game space with the first and second characters acting in the game space on a display unit connected to the game system;
controlling the first and second characters;
storing at a storage a plurality of action pattern routines including first to third action pattern routines, the first action pattern routine including first and second actions, the second action pattern routine including the first action; and selecting the first action pattern routine, and determining an action modification condition to replace the first action pattern routine with the third action pattern routine, wherein the controlling the first character includes controlling the first character to perform routinely the first and second actions with the second action subsequent to the first action when the first action pattern routine is selected for the first character, wherein the character control unit controls the second character to perform the first when the first action pattern routine is selected for the second character.

8. The game system control method according to claim 7, wherein the character control unit controls the second character to perform routinely the first and second actions with the second action subsequent to the first action when the first action pattern routine is selected for the second character, and wherein the controlling the first character includes controlling the first character based on at least one of the number of the action pattern routines and an order of the first and second actions.

9. The game system control method according to claim 7, further comprising determining whether the action modification condition has been met, wherein the determining the action modification condition to replace includes replacing the first action pattern routine with the third action pattern routine when the action modification condition is met.

10. The game system control method according to claim 7, wherein the action modification condition has been met when a predetermined parameter amount regarding the status of the first character is within a predetermined range.

11. The game system control method according to claim 7, further comprising displaying on the display unit an indicator indicating a change in the parameter amount of the first character, and wherein the indicator displays a threshold value for replacing the first action pattern routine.

12. The game system control method according to claim 8, wherein the action modification condition for replacing the first action pattern routine of the first character is different from an action modification condition for replacing the first action pattern routine of the second character.

13. A non-transitory storing media readable on the computer device which stores executable instructions, the executable instructions comprising:

generating a virtual game space where first and second characters act and displaying the game space with the first and second characters character acting in the game space on a display unit connected to the computer device;

controlling the first and second characters; and storing at a storage a plurality of action pattern routines including first to third action pattern routines, the first action pattern routine including first and second actions, the second action pattern routine including the first action; and selecting the first action pattern routine, and determining an action modification condition to replace the first action pattern routine with the third action pattern routine, wherein the controlling the first character includes controlling the first character to perform routinely the first and second actions with the second action subsequent to the first action when the first action pattern routine is selected for the first character, wherein the character control unit controls the second character to perform the first action when the first action pattern routine is selected for the second character.

14. The non-transitory storing media according to claim 13, wherein the character control unit controls the second character to perform routinely the first and second actions with the second action subsequent to the first action when the first action pattern routine is selected for the second character, and wherein the controlling the first character includes controlling the first character based on at least one of the the action pattern routines and an order of the first and second actions.

15. The non-transitory storing media according to claim 13, the executable instructions further comprising determining whether the action modification condition has been met, wherein the determining the action modification condition to replace includes replacing the first action pattern routine with the third action pattern routine when the action modification condition is met.

16. The non-transitory computer-readable storage medium according to claim 13, wherein the action modification condition has been met when a predetermined parameter amount regarding a status of the first character is within the predetermined range.

17. The non-transitory storing media according to claim 13, the executable instructions further comprising displaying on the display unit an indicator indicating a change in the parameter amount of the first character, and wherein the indicator displays a threshold value for replacing the first action pattern routine.

18. The non-transitory storing media according to claim 14, wherein the action modification condition for replacing the first action pattern routine of the first character is different from an action modification condition for replacing the first action pattern routine of the second character.

* * * * *